Figure 1:
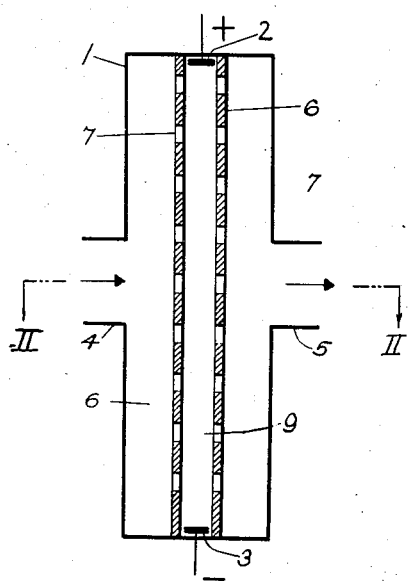

Aug. 26, 1958    J. C. DEVINS ET AL    2,849,357
HYDRAZINE
Filed Dec. 12, 1955

INVENTORS
JOHN C. DEVINS
BY MILTON BURTON
ATTORNEY

United States Patent Office 2,849,357
Patented Aug. 26, 1958

2,849,357

HYDRAZINE

John C. Devins, Schenectady, N. Y., and Milton Burton, Mischawaka, Ind., assignors to Olin Mathieson Chemical Corporation, East Alton, Ill., a corporation of Virginia Application December 12, 1955, Serial No. 552,497

5 Claims. (Cl. 204—177)

This invention relates to the synthesis of hydrazine from ammonia and more particularly to such synthesis by means of electrical discharge and apparatus suitable therefor. This application is a continuation-in-part of our co-pending application, Serial No. 263,754, filed December 28, 1951, now abandoned.

Electrical discharge methods have the advantage that extremely high temperatures may be applied to the material to be processed permitting the rapid attainment of high energy levels without subjecting the resulting products to such temperatures for any substantial period of time. This is of importance in the preparation of hydrazine because of its decomposition, sometimes with violence, at temperatures above about 350°–400° C. It was known heretofore that when ammonia at an absolute pressure in the range from about 40 to 760 millimeters mercury was subjected to high frequency electrical excitation with crossed electrodes at voltages effecting glow discharge, hydrazine was formed. The yield of hydrazine obtained by such process, however, was too low to permit economical production, e. g. less than two grams per kilowatt hour.

Westhaver in his article entitled "Chemical action in the glow discharge," published beginning on page 897 of the Journal of Physical Chemistry, volume 37, No. 7, dated May 3, 1933, discloses that nitrogen and hydrogen are the products of ammonia decomposition by electrical excitation, but that some hydrazine was detected after electrical excitation of static ammonia at one millimeter pressure. The process disclosed by Westhaver for producing hydrazine is not practical, however, because of the low yield obtained based upon power consumption and because his static system and other conditions disclosed for the treatment of ammonia are unsuitable for the preparation of hydrazine in practical amounts.

It is an object of this invention, therefore, to provide an electrical discharge method for obtaining hydrazine from $NH_3$ in substantially higher yield. Another object is to provide a novel method for producing hydrazine. A further object is to provide a method and electrical apparatus for obtaining hydrazine from ammonia in materially higher yield per kilowatt hour input than heretofore obtained by glow discharge technique. Still another object is to provide a relatively non-hazardous method for producing hydrazine without the necessity of employing costly chemical raw materials. Another object of the invention is to provide a method for making hydrazine by electrically exciting ammonia flowing continuously through a glow discharge apparatus.

Figure 2:
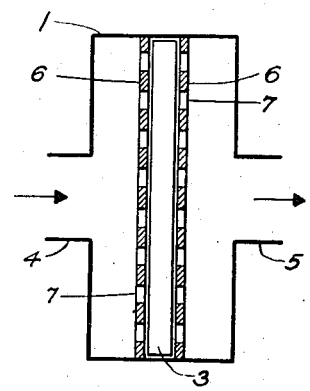
Figure 3:
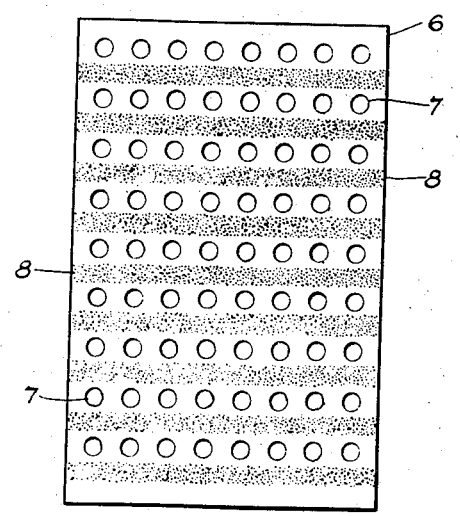

Numerous other objects and advantages will become apparent from the following detail description and accompanying drawing, in which:

Figure 1 is a diagrammatic sectional view of an electrical discharge vessel illustrating one embodiment of this invention, Figure 2 is a diagrammatic sectional view of the vessel taken at II—II of Figure 1, and Figure 3 is a vertical view illustrating the partitions 6 of Figures 1 and 2.

It has now been found in accordance with this invention that hydrazine can be formed in yields in excess of 3 grams per kilowatt hour and in fact, up to about 30 grams per kilowatt hour by the electrical excitation of a stream of ammonia for a short period at absolute pressures in the range from about 3 millimeters to about 10 millimeters mercury.

Referring to the drawing the apparatus used involves essentially a vessel 1 adapted for application of a vacuum and having as electrodes an anode 2 and a cathode 3, an inlet 4 for the ammonia, an outlet 5 for the reaction products which are hydrazine, ammonia, hydrogen and a small amount of nitrogen, and permeable partitions 6 forming the side walls of the glow discharge chamber 9. The permeable partitions 6 are formed of an electrical non-conductor and must be of sufficient permeability to permit relatively free flow of the gas from the inlet 4 to the output 5. The partitions may be formed of a non-conductor such as glass provided with perforations 7 as illustrated in the drawing. The partitions 6 serve the purpose of confining the discharge glow in the chamber 9 between them while at the same time permitting the gas to flow therethrough. They are spaced with their faces relatively close together, preferably in the neighborhood of about one centimeter apart, in order to provide a relatively short path for the ammonia passing through the discharge. Tantalum has been found particularly effective as the electrode material. Any suitable electrode material, such as copper, silver, iron, platinum, or the like may be used. As illustrated in the drawing the anode 2 is at the top of the glow chamber 9 formed by the partitions 6 and the cathode 3 is at the bottom of the chamber, with both the electrodes extending the full width of the chamber 9 so as in effect to form the top and bottom thereof.

When a suitable direct current voltage is applied to the electrodes a glow discharge is effected in which the plasma, substantially confined between the partitions 6, is composed for the most part of electrons traveling at high speed toward the anode and of ionized and excited particles of the media. When ammonia is so treated all of the usual zones of the discharge are visible. The negative glow is blue and varies in shape from a relatively thin disk at about 10 millimeters' pressure to a relatively large cloud at 1 millimeter pressure. The Crookes dark space is visible at the lower pressures and the Faraday dark space can be seen at all pressures in the pressure range from 3 to 10 millimeters. The positive column is green and contains no visible striations. It has been found preferable to use a current density in the range of about 0.6 milliampere to 6 milliamperes per square centimeter in order that the glow discharge be maintained and arcing avoided. An applied voltage in the neighborhood of about 25 to 70 volts per centimeter of linear path between the electrodes has been found particularly effective. It has also been found that significant hydrazine production occurs only in the positive column or region of positive glow. For this reason the discharge tube construction is preferably such and the conditions of operation are preferably such as to maintain the ratio of volume of negative glow to volume of positive glow at a minimum, with a relatively long positive column. When the distance between the electrodes is increased for any given pressure, the length of the positive glow column increases proportionately but the negative glow region remains substantially constant in length. The distance between the electrodes is therefore made as great as available voltages and other conditions will permit in order that minimum percentage, preferably less than 5 percent, of the power input will be expended in the substantially non-productive negative glow region. For example, electrode distances resulting in a positive column or positive plasma in the neighborhood of about 100 to about 160 centimeters or more should be utilized. That is to say, an interelectrode distance of less than about 50 centimeters should be avoided to avoid excessive energy costs and impractical operating conditions. Use of such interelectrode distances along with the conditions herein specified results in a practical process, whereas, use of only the pressure and current densities specified, will not produce a practical yield of hydrazine, as is evidenced by the Westhaver disclosure referred to hereinabove.

Inasmuch as there is a tendency toward lower yields of hydrazine with increased residence time of the hydrazine in the discharge, the vessel construction is preferably such that the major portion of the ammonia flows for only a short distance through the positive column, e. g. the gas stream can be fed transverse to the column, and the rate of flow is adjusted to minimize the dwell of the products in the vessel. It is essential that the flow rate of the ammonia be adjusted so that the maximum residence time within the eeffctive region of the glow discharge is not materially more than 10 milliseconds. A flow rate in the neighborhood of 545 centimeters per second, in the apparatus described in the example, is advantageous because the residence time is well below 10 milliseconds. The ammonia should be flowed transversely through the positive plasma in order to obtain the required residence time with the least difficulty. Transverse flow is advantageous over longitudinal flow because at any given flow rate of ammonia the period of exposure of any particular portion of the ammonia to the discharge will be less with transverse flow than with longitudinal flow.

In the formation of hydrazine from ammonia by the process herein described hydrogen ions and amino radical are first formed. The amino radicals, i. e. $NH_2$, tend to combine one with another to form hydrazine. It has been found the hydrogen ions have a strong tendency to recombine with the amino radicals to reform ammonia and the greater the concentration of hydrogen ions in the mixture the greater the amount of ammonia reformed, thus cutting down on the yield of hydrazine obtained per unit of power applied. The concentration of hydrogen ions increases with the time of exposure of any given portion of the mixture to the electrical excitation, since more and more of the ammonia is broken down. This accounts for the fact that greater yields of hydrazine are obtained by using transverse flow through the positive glow discharge.

The yield of hydrazine is still further increased by utilizing a catalyst for the recombination of hydrogen ions to form molecular hydrogen which is then inactive towards recombination with the amino radicals. Hydrogen ions are activated to recombine with one another and form molecular hydrogen by practically any solid surface upon which they impinge, so that any solid material presenting a large amount of surface in the active region of the glow discharge is effective as a catalyst to improve the yield. However, some catalysts are more effective than others for the purpose and metallic catalysts are preferred over glass and other non-metallic materials. Metals of the platinum group are particularly well suited for the purpose. For example, platinum and palladium are particularly effective but any other metal or other material which will accelerate the combination of hydrogen ions with each other to form hydrogen molecules, such as, for example, silver, iron, copper, nickel and the like can be utilized. Such a catalyst is shown in the drawing, Figure 3 at 8, as a series of horizontal bands coated on the glow sides of the partitions 6. Such a metallic coating must, of course, be discontinuous vertically to prevent electrical short-circuiting between the electrodes.

The yield of hydrazine is likewise in general increased by maintaining a relatively high ratio of applied voltage to pressure, within the permissible limits. Increase in this ratio results in an increase in electron temperature and average velocity. Some increase in yield is also effected by applying heat to the vessel to provide an elevated temperature preferably in the neighborhood of 200° C., but in any case less than about 350°–400° C.

In order that the invention may be more clearly understood and further clarified, following are examples illustrating typical embodiments of the invention.

Example A

Ammonia is fed into the inlet 4 of vessel 1 to effect the flow thereof through the partitions 6 at a rate equivalent to about 4.56 cubic centimeters per second, calculated at standard temperature and pressure, for each 5.3 square centimeters of the face of the partition 6 adjacent the inlet 4. The area of the perforations 7 in the partition 6 is included in calculating the total area of the face for this purpose. The distance between the electrodes is about 159 centimeters. No external heat is applied to the vessel and no catalyst is included on the partitions. An absolute pressure of about 7.01 millimeters is maintained in the vessel 1 and voltage is applied across the electrodes, which are formed of tantalum, to effect a current density of about 2 milliamperes per square centimeter. A direct current voltage of about 59.8 volts per centimeter of linear path between the electrodes is ordinarily sufficient to effect the foregoing current density. The gaseous products issuing from the outlet 5 are refrigerated to effect removal of the hydrazine therefrom and a yield of hydrazine of about 7.7 grams per kilowatt hour is obtained. With substantially the same rate of flow of ammonia, temperature, current density, and with no catalyst, but with a vessel absolute pressure of about 5.05 millimeters mercury and an applied voltage of about 48.3 per centimeter of linear path between the electrodes, a hydrazine yield of about 6.5 grams per kilowatt hour is obtained.

Example B

Ammonia is fed into the inlet 4 at substantially the same rate as used in Example A. The absolute pressure of the vessel is maintained at about 8.3 millimeters of mercury. The distance between the electrodes is about 159 centimeters. A current density of about 4 milliamperes per square centimeter is obtained by applying a direct current voltage of about 58 volts per centimeter of linear path between the tantalum electrodes. No catalyst is included on the partitions 6 but the vessel walls are heated to about 200° C. A hydrazine yield of about 10.6 grams per kilowatt hour is obtained. With substantially the same current density, rate of ammonia flow and with no catalyst on the partitions 6, but with a vessel absolute pressure of about 10.8 millimeters mercury, with the vessel heated to a temperature of about 350° C. and with an applied direct current voltage of about 65 volts per centimeter of linear path between the electrodes, a hydrazine yield of about 9.5 grams per kilowatt hour is obtained.

Example C

Ammonia is fed into the inlet 4 at substantially the same rate as used in Example A. The absolute pressure of the vessel is maintained at about 5.05 millimeters mercury. The distance between the electrodes is about 159 centimeters. A current density of about 2 milliamperes per square centimeter is obtained by applying a direct current voltage equal to about 63.7 volts per centimeter of linear path between the tantalum electrodes. No heat is applied externally to the vessel. A platinum coating is applied inside glow chamber 9 in horizontal bands or strips to the adjacent faces of the partitions 6 between the rows of perforations 7, as indicated at 8, Figure 3. A hydrazine yield of about 30.2 grams per kilowatt hour is obtained. With an ammonia flow rate equivalent to about 3.1 cubic centimeters per second, calculated at standard pressure and temperature, per each 5.3 square centimeters of the partition 6 face adjacent the inlet, with a current density of about 2 milliamperes per square centimeter obtained by applying a direct current voltage to the tantalum electrodes equivalent to about 37.7 volts per centimeter of linear path between the electrodes, with a vessel absolute pressure of about 3.08 millimeters mercury, with no external application of heat to the vessel walls and with the platinum catalyst on the faces of the partitions 6 inside the glow chamber 9, a hydrazine yield of about 23 grams per kilowatt hour is obtained.

In each of the above examples the partitions 6 are spaced apart about one centimeter. By thus using absolute pressures in the range from about 3 to about 10 millimeters mercury in accordance with this invention, the hydrazine yield per kilowatt hour is at least triple that obtained by prior glow discharge methods, by applying heat to the vessel, the yield is still further multiplied, and by utilizing the catalyst inside the glow discharge chamber the yield is increased to over ten times that obtained by prior methods.

While in the foregoing examples, the process and apparatus are set forth in considerable detail, it will be understood that various modifications may be made therein without departing from the spirit and scope of this invention. For instance, the catalyst may be in the form of metal foil or the like, or other combinations of current density, pressure, temperature, etc. within the specified limits may be employed, and known absorption methods and technique may be employed instead of refrigeration to segregate the hydrazine.

As indicated hereinbefore, by flowing the gas transversely through the positive glow column, the hydrazine formed remains only a short time in the discharge region. By flowing the gas "transversely," as set forth herein, it is meant that the gas is caused to flow substantially perpendicular to the longitudinal axis of the glow discharge column, or at such small angle deviating therefrom as not to result in a materially decreased yield due to an increased residence time. While greater yields may be obtainable by further shortening the residence time of the hydrazine in the discharge column, practical considerations such as maintaining the glow discharge and construction limitations prevent spacing the partitions 6 or glow discharge chamber 9 walls much closer than about one centimeter. Although yields of hydrazine in excess of those obtained with prior discharge methods may still be had in accordance with this invention with the partitions spaced more than one centimeter apart, the yield of hydrazine is reduced as the length of glow path through which the gas must pass is increased. As indicated hereinbefore, the electrodes are spaced apart as far as feasible in order to provide a long column of positive glow or a large ratio between positive and negative glow regions, to increase the capacity of the vessel and yield per kilowatt hours. The perforations in the partitions should not be of size sufficient to prevent the partitions from substantially confining the glow to the chamber 9.

Having thus described the invention in detail, what is claimed and desired to be secured by Letters Patent is:

1. The method of preparing hydrazine which comprises electrically exciting ammonia in a reaction vessel in the presence of platinum at an absolute pressure in the range of about 3 millimeters to about 10 millimeters mercury by flowing it through a region of positive glow at a current density in the range from about 0.6 milliamperes to about 6.0 milliamperes per square centimeter.

2. The method of preparing hydrazine which comprises electrically exciting ammonia in the presence of platinum at an absolute pressure in the range of about 3 millimeters to about 10 millimeters mercury by flowing it transversely through a positive glow column having a thickness of about one centimeter with the current density in said column being about 0.6 milliamperes to about 6.0 milliamperes per square centimeter.

3. The method of preparing hydrazine which comprises subjecting ammonia at a pressure of substantially 3 to 10 millimeters of mercury to a direct current electrical glow discharge formed at a voltage of about 25 to 70 volts per centimeter and at a current density of substantially 0.6 to 6.0 milliamperes per square centimeter between electrodes spaced substantially 50 to 160 centimeters apart, at least about 95% of the electrical energy input into the said discharge being expended in the positive region, and causing the ammonia to flow transversely through the said positive region with a residence time therein of not more than 10 milliseconds.

4. The process of claim 3 wherein the transverse dimension of said discharge is about one centimeter.

5. The process of claim 3 wherein the temperature is maintained at substantially 200° C.

References Cited in the file of this patent

UNITED STATES PATENTS

| | | |
|---|---|---|
| 974,741 | Blackmore | Nov. 1, 1910 |
| 1,079,705 | Hlavati | Nov. 25, 1913 |

OTHER REFERENCES

Westhaver: Journal of Physical Chemistry, vol. 37, 1933, pages 897–905.

Audrieth et al.: Chemistry of Hydrazine, 1951, pages 23–24.